United States Patent [19]

Young et al.

[11] Patent Number: 4,509,770

[45] Date of Patent: Apr. 9, 1985

[54] DRAWBAR COVER

[75] Inventors: David A. Young, Plymouth; William H. Hummel, Ann Arbor, both of Mich.

[73] Assignee: Draw-Tite, Inc., Belleville, Mich.

[21] Appl. No.: 396,555

[22] Filed: Jul. 9, 1982

[51] Int. Cl.³ .............................................. B60D 1/06
[52] U.S. Cl. .................................. 280/507; D12/162; 40/10 R; 280/506
[58] Field of Search ...................... 280/504, 506, 507; D12/162; 40/306, 307, 310, 311, 324, 334, 336, 10 R

[56] References Cited

U.S. PATENT DOCUMENTS 2,616,717 11/1952 Dunlap ................................ 280/507
2,860,431 11/1958 Barnum, Jr. ........................ 40/306
3,660,915 5/1972 Davis .................................. 40/10 R
3,824,720 7/1974 Langwell ............................ 40/10 R

OTHER PUBLICATIONS

SAE Standard J684f, May 1978.

Primary Examiner—Joseph F. Peters, Jr.
Assistant Examiner—Kenneth R. Rice
Attorney, Agent, or Firm—Stephenson & Boller

[57] ABSTRACT

A decorative cover for the end of a drawbar comprises top and sidewall portions overlying top and side surfaces of the drawbar member. The cover is a bright shiny metal which dresses up the drawbar member. The cover mounts without the use of any additional fasteners, the cover top wall comprising an aperture aligned with the hole in the drawbar member for the towing ball mounting and the cover being held in place by the towing ball mounting. The top wall of the cover contains a further aperture allowing viewing of hitch load rating data on the drawbar; alternatively said further aperture may be omitted and instead a blank space provided for the installer to inscribe the load rating data directly on the cover.

5 Claims, 5 Drawing Figures

U.S. Patent Apr. 9, 1985 4,509,770
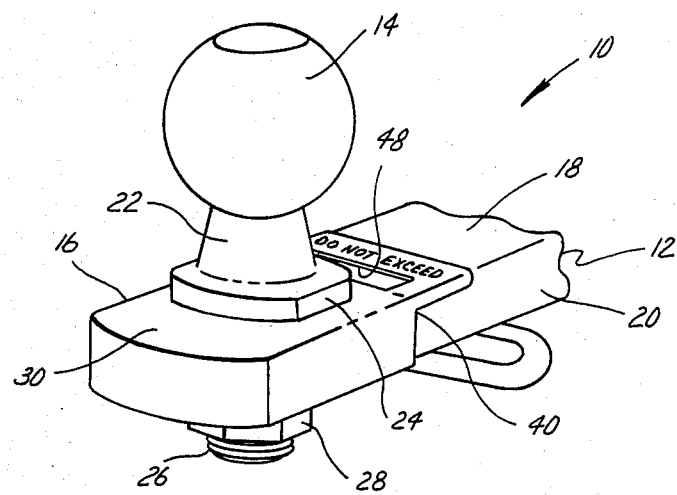
Fig. 1
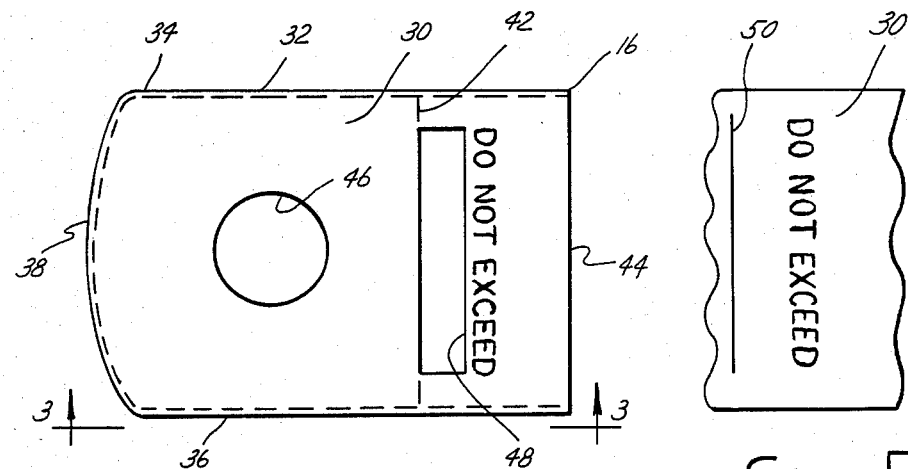
Fig. 2
Fig. 5
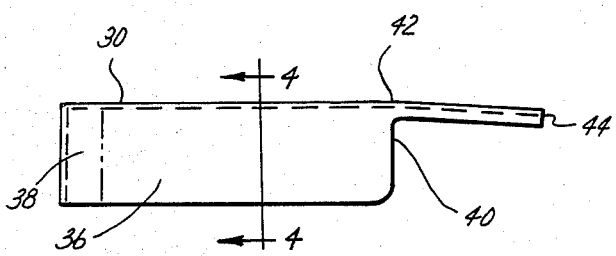
Fig. 3
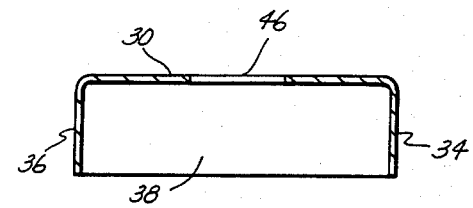
Fig. 4

DRAWBAR COVER

BACKGROUND AND SUMMARY OF THE INVENTION

This invention relates generally to trailer hitches and is particularly concerned with a decorative cover for a trailer hitch drawbar.

Trailer hitches are mounted on the rear of a vehicle to provide for connection for a trailer which is to be towed by the vehicle. The drawbar of the hitch is the member which projects rearwardly of the vehicle and on the terminal end portion of which the towing ball is mounted. The trailer which is to be towed comprises a coupler which engages the towing ball.

Hitches are currently manufactured in different sizes and in different finishes. For example a hitch may be finished in either zinc plate, chrome plate, or other. The zinc plated finish possesses excellent corrosion resistance, but unfortunately it has a somewhat dull appearance which is generally considered less attractive than the bright shiny finish which is characteristic of a highly buffed chrome plated version. While the chrome plated finish is desired for its decorative character, it is a more expensive version than the zinc plated version. Accordingly, some customers may want one version while others will want the other. In order to have both types of hitches available in all sizes for customers it is necessary for hitch manufacturers and dealers to make and stock two different finishes of hitches for each hitch size.

The present invention is directed to a decorative cover for the drawbar of a hitch. With the invention, hitch manufacturers and dealers need make and stock only one finish (i.e., the zinc plate) in each hitch size, and the cover is used to give decorative appearance to the drawbar. The basic zinc plated hitch which is manufactured and stocked possesses good corrosion resistance and is of lower cost than the chrome plated version. If a customer desires to "dress up" the basic hitch, the decorative cover of the present invention is added to the drawbar to impart a bright shiny appearance. The invention offers the possibility for significantly reducing inventory carrying costs and for simplifying ordering and scheduling for manufacturing, yet it allows the demands of customers for a bright finish to be readily met. Not only can the cover be used on original equipment hitches, but it can also be used to dress up previously used hitches.

The cover can be economically manufactured and is installable on a hitch without the use of any additional parts. The preferred disclosed embodiment comprises a stamped stainless steel cover whose exterior surfaces are polished to a high luster finish. The cover is thereby rendered highly decorative in character. The cover includes a circular aperture in its top wall which aligns with the mounting hole in the drawbar member for the towing ball. Hence assembly of the cover to the drawbar is accomplished by placing the cover onto the terminal end portion of the drawbar member and then assembling the towing ball in the usual manner. The mounting of the towing ball holds the cover in place.

A further feature of the invention is that the top wall is formed so that in its free condition its shape is slightly different from the top surface of the drawbar member. When the ball is being mounted, the tightening of the associated fastener causes a flange to draw the top wall of the cover against the top surface of the drawbar member. The cover resiliently flexes from its free shape so that its forward edge is forced into contact with the top surface of the drawbar. This prevents rattling and it reduces the liklihood of foreign objects and materials, such as the bristles of a carwash brush, from catching under the forward edge of the cover.

A still further atribute of the invention is that the cover may be used for drawbars of different load ratings. In this regard the disclosed embodiment comprises an aperture in the top wall through which the underlying load rating of the hitch is rendered visible when the cover is installed. Hence the inclusion of the cover will not obstruct the load rating on certain models of hitches yet it provides decorative appearance to a substantial portion of the exterior surface of the drawbar. A maximum amount of bright appearance is promoted by incorporating a portion of the load rating notice into the cover itself adjacent the aperture but with the actual load rating number being visible through the aperture.

For certain drawbars the rating notice may not be in a position which is correspondent with the location of the aperture. Hence an alternative arrangement would involve the provision of the load rating notice on the cover with a blank space which is to be inscribed by the user with the proper load rating.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a perspective view of a portion of a drawbar illustrating the present invention.

FIG. 2 is a top plan view of one of the elements shown in FIG. 1 by itself.

FIG. 3 is a side vertical view as taken in the direction of arrows 3—3 in FIG. 2.

FIG. 4 is a vertical sectional view taken in the direction of arrows 4—4 in FIG. 3.

FIG. 5 is a fragmentary top plan view illustrating a modification.

DESCRIPTION OF THE PREFERRED EMBODIMENT

FIG. 1 illustrates a drawbar assembly 10 embodying principles of the present invention. The drawbar assembly is a component of a trailer hitch which mount on the rear of a vehicle (not shown). FIG. 1 is a view looking toward the left and rear of the vehicle containing the hitch from a viewing location which is rearward of the hitch. The assembly 10 comprises a drawbar member 12 and a towing ball 14 mounted on the terminal end portion of drawbar member 12. In accordance with principles of the present invention a decorative cover 16 is fitted in close conformity onto the terminal end portion of drawbar member 12 yet leaving ball 14 available for connection to a coupler on a trailer (not shown) which is to be towed by the vehicle containing the hitch.

Drawbar member 12 has a generally rectangular cross sectional shape and comprises a top surface 18 and longitudinally extending side surfaces 20. The far side surface 20, along with the bottom surface and the end surface, are not viewable in FIG. 1. The drawbar member 12 also contains a vertical circular through-hole extending from top surface 18 to the bottom surface to provide for the mounting of ball 14.

Ball 14 is disposed on a stem 22 which includes a flange 24. A threaded shank 26 passes through the circular through-hole in the drawbar member, and a nut 28 is threaded onto shank 26 to secure the ball in place. Preferably a lock washer (not viewable in FIG. 1) is also provided between nut 28 and the bottom surface of drawbar member 12. With nut 28 fully tightened, flange 24 is forcefully drawn toward top surface 18 of drawbar member 12.

Cover 16 has a shape conforming to that of the terminal end portion of drawbar member 12. It comprises a top wall 30 and a sidewall 32. Top wall 30 overlies top surface 18 of drawbar member 12, and sidewall 32 overlies the side surfaces 20 as well as the end surface. Sidewall 32 may therefore be considered as comprising spaced apart longitudinally extending sections 34 and 36 which overlie the respective side surfaces 20 and a laterally extending section 38 which overlies the end surface of drawbar member 12. The end surface of the drawbar member has a convex contour and hence the laterally extending section 38 of the cover sidewall has a similar matching contour. The height of sidewall 32 is uniform throughout both the length of section 38 and also the immediately contiguous portions of the longitudinally extending sections 34 and 36. However, the longitudinally extending sections 34, 36 contain notches 40 at the end opposite section 38 such that the height of the longitudinal sections of the sidewall at the forward end of the cover is substantially reduced.

The cover is fabricated such that in the free condition top wall 30 is formed with a transverse bend line 42. This bend line is located longitudinally at the transitions in the height of the sidewall sections 34 and 36. Hence the forward portion of the top wall (to the right of bend line 42 as viewed in FIG. 2) is inclined downwardly at a small angle to the remainder of the top wall which is to the left of the bend line 42. This inclination can be best seen in FIG. 3. For example an angle of 3° nominal is suitable. The shape of the top wall is thereby, in the free condition of the cover, not precisely correspondent with that of the top surface 18 of drawbar cover 12. Thus, when the cover is assembled onto the drawbar member and the ball installed, the cover is resiliently flexed so that its forward edge 44 is forced against the top surface 18. This is beneficial in that it minimizes the chances of foreign materials catching under the forward edge of the installed cover.

The top wall of the cover is also provided with a circular hole 46 which is in alignment with the mounting hole in the drawbar member for the ball. With the cover in place on the drawbar member 12, the ball is assembled by passing the threaded shank 26 through the aligned holes in the cover and drawbar members and by running nut 28 onto shank 26. Flange 24 overlies top surface 18 around hole 46, and in this way when nut 28 is tightened, the top wall of the cover is resiliently flexed from its free condition onto and against top surface 18 of the drawbar member. The cover is thereby secured against rattle and its forward edge is concurrently urged against the top surface of the drawbar member as explained above.

In certain hitch constructions the towing capacity of the hitch is marked for display by placement of load rating data on drawbar member 12. Cover 16 includes an aperture 48 through which the load rating data are rendered visible when the cover is installed. In one model of hitch the load rating data are on the top surface of the drawbar member just forwardly of the mounting of the ball. The illustrated embodiment of cover shows aperture 48 to be of rectangular shape and with the rear edge of the aperture (left-hand edge as viewed in FIG. 2) co-linear with the bend line 42. The size of aperture 48 is such that only the numerical load rating is visible through the aperture. This number may be only a portion of the entire load rating notice. For example the entire load rating notice on the drawbar member may read as follows "DO NOT EXCEED 2,000 LBS." This may consist of two separate lines, one line containing the words "DO NOT EXCEED" and the second line containing "2,000 LBS." In order to maximize the amount of bright appearance for the cover it is desirable that the aperture 48 be as small as possible. Hence the aperture 48 is sized so that only the line "2,000 LBS." is viewable. Completion of the notice may be done by embossing the words "DO NOT EXCEED" into the top wall of the cover as shown in FIG. 2. Hence with the cover installed on the drawbar a portion of the whole load rating notice is provided on the cover while the remainder is viewable through the aperture.

FIG. 5 illustrates a modification in which aperture 48 is omitted. Instead, a blank line 50 is embossed or inscribed into the cover, and the load rating is entered onto the blank line in the available space by the installer.

Cover 16 is fabricated from any suitable bright appearing material. For example stainless steel, type 304, #22 gage, whose outer surfaces are polished to a high luster finish presents a bright shiny appearance. The stainless steel cover may be fabricated by conventional manufacturing techniques with the illustrated cover being a stamped piece. The cover may be used as a component of an original equipment hitch or it can be marketed as an after-market item for installation on existing installed hitches. Insofar as hitch manufacturers and dealers are concerned the present invention allows a single basic hitch to be manufactured in each size and stocked and to be dressed up through use of the bright shiny drawbar cover. Obviously the dimensions of the drawbar may vary in accordance with the load rating of the hitch, and different sizes of covers may be required to encompass the full range of drawbar sizes. Also the particular nature of the load rating notice may differ depending upon the particular hitch, and it should be understood that the notice may involve either or both of the GVW (gross vehicle weight) of the trailer and the trailer tongue weight. Although reference has been made to zinc plate as constituting a finish with which the cover may be used, it should be recognized that the cover may used to decorate drawbars having other than that finish. While a preferred embodiment of the invention has been disclosed, it will be appreciated that it principles may be applied to other embodiments.

What is claimed is:

1. In a drawbar assembly comprising a drawbar member having a terminal end portion and a ball mounted on said terminal end portion, a cover fitting in close conformity onto said terminal end portion and leaving the ball available for connection with a coupler, said terminal end portion comprising a top surface and said cover comprising a top wall overlying said top surface, aligned apertures through said top wall and said terminal end portion of said drawbar member, said ball being disposed on a stem having a flange overlying said top wall around the aperture therein, and fastening means including a threaded shank passing through said apertures urging said flange, and corresponding said top wall, toward said drawbar member, the improvement in which said top wall, in the free condition of said cover, has a shape slightly different from that of said top surface so as to be flexed from its free shape by said fastening means.

2. The improvement set forth in claim 1 in which said top wall comprises a transverse bend line which divides said top wall into two substantially planar sections which are at a small angle to each other.

3. The improvement set forth in claim 2 in which a further aperture is provided in said top wall with a portion of the edge of said further aperture being co-linear with a portion of said transverse bend line, said top surface containing indicia relating to the load rating of the drawbar assembly which is visible through said further aperture.

4. A cover for covering the terminal end portion of a drawbar member comprising a top wall for covering the top surface of the terminal end portion of the drawbar member and a sidewall for covering the side surface of said terminal end portion, and an aperture in said top wall to accommodate the mounting of a ball on the drawbar member, said top wall comprising spaced apart longitudinally extending edges which are joined by a generally transversely extending edge and said sidewall comprising spaced apart longitudinally extending sections having edges joining to the longitudinally extending edges of the top wall and a generally laterally extending section having an edge joining to the generally laterally extending edge of said top wall, said sidewall being continuous along its length and said generally laterally extending section of said sidewall and immediately contiguous portions of the longitudinally extending sections of said sidewall have a substantially uniform height, the longitudinally extending sections of said sidewall beyond said portions thereof immediately contiguous said laterally extending section thereof having a reduced height, and in which said top wall includes a transverse bend line which is longitudinally disposed at the transitions in height of said longitudinally extending sidewall sections so that the portion of said top wall which is longitudinally coextensive with the reduced height portions of said sidewall sections is at a small angle to the remainder of said top wall on the opposite side of the bend line.

5. A cover as set forth in claim 4 including means defining a further aperture in said top wall having an edge portion which is co-linear with a portion of the transverse bend line.

* * * * *